9772X
P. M. Martz,
Planing and Matching Machine.
Patented June 25, 1836.
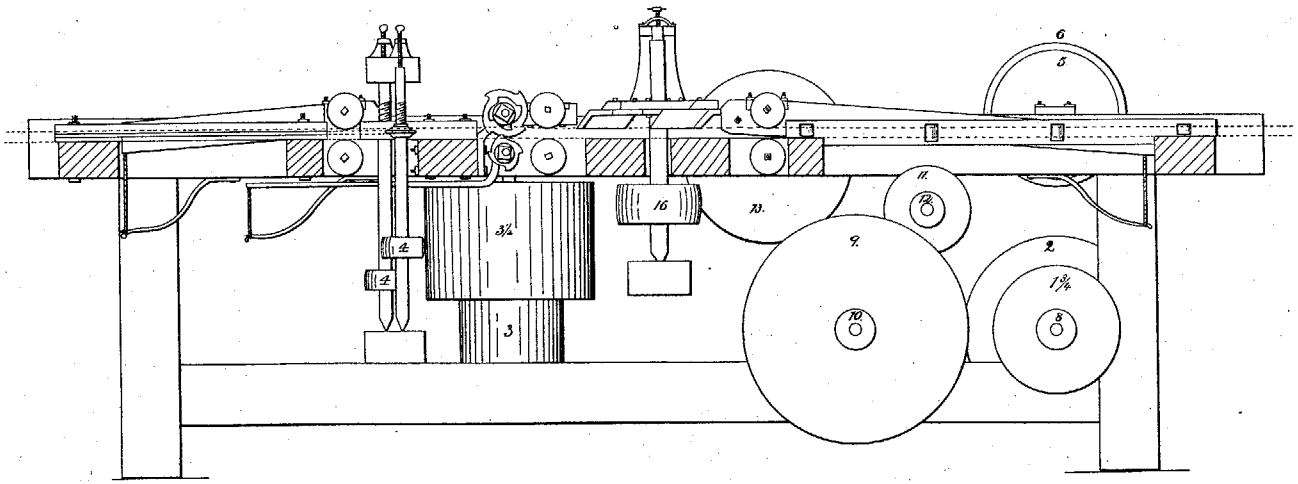
AM. PHOTO-LITHO. CO. N.Y. (OSBORNE'S PROCESS)

P. M. Martz, of the Borough of Indianapolis, Indiana.

Letters Patent

The schedule referred to in these Letters Patent and making part of the same containing a description in the words of the said P. M. Martz him self of his improvement in the machine for planing, Tonguing and Grooving Flooring Plank, To all to whom these presents shall come, Be it known that I P. M. Martz of the Borough of Indianapolis in the County of Marion and State of Indiana, have invented a new and useful Planing Mill for the purpose of Planing, Tonguing and Grooving Flooring Boards and that the following is a full and exact description thereof.

Frame 12 feet long, 3 feet 4 inches high, 4 feet 6 inches wide, all made of scantling 6 by eight inches framed with tennents and mortices and made fast by screw bolts or keys. The ground pulley or band wheel marked No. 1 on the profile, being 15 inches in diameter, and is made fast on the one end of an iron shaft 6 feet 6 inches long 1½ inches square and lays horri-zontal across the lower part of the frame near the one end.

The said pulley or band wheel being propelled by band from either Steam, water, or horse power, Pulley or band wheel No. 2. being fast on same shaft and is 22 inches in deamiter and by band giving motion to No. 3. Pulley or band wheel No. 8. being fast on same shaft, and is 4 inches in deamiter and by band giving motion to No. 9. Pulley or band wheel immediately under No. 8 being fast on same shaft, and is six-teen inches in deamiter and by band giving motion to No. 5. — Pulley or band wheel No. 5. being 15 inches in diameter and is made fast on an iron shaft which lays horrizontal on the top of the frame, and is 2 feet long 1¼ inches square and giving motion to No. 6. on same shaft, and is 20 inches in diameter and by band giving motion to 2 pulleys or band wheels marked No. 7. — Pulley or band wheel No. 3. being 12 inches in diameter and is made fast on an iron shaft, 3 feet long 1¼ inches square — and stands vertical on the outside of the frame near opposite to the centre and gives motion to No. 3 ½ on same shaft and is 20 inches
in diameter and by bands gives motion to 2 pulleys or band wheels No 4
and 1 No. 16 — Pullay or band wheel No 7 being 5 inches in diame-
& are made fast on 2 iron shafts 4 feet 6 inches long 1½ inches in diame
ter and lay horrizontal across the lip of the frame immediately over
each other, on which shafts knives or cutters are made fast, which
work the tongue and make straight the other edge of the board pre-
paired for the groove to be cut therein, These cutters are made fast
by screws and taps prepared to be set for wide and narrow boards
Pullays or band wheels No 4 being 5 inches in diameter and made
fast on 2 iron shafts 2 feet 6 inches long 1½ inches square and stand
vertical at the edge of each board, on same shaft the cutters are made
fast by screws and taps and makes the groove into the edge of each board
Pullay or band wheel No 16, being 10 inches in diameter, and is made
fast on a cast iron shaft 2 feet 8 inches long and 2 inches in diameter.
and stands vertical within 18 inches of the one edge of the frame and opposite
to the centre on which shaft there is a cast iron boss made fast which
has 4 arms on which arms are made fast by screw bolts 4 knives or
cutters 8 inches long and stand 2 inches down, the lower edge of the knives
being laid with steel and made sharp to plane the boards, as they pass
through between the edge of the cutters and the frame — The vertical shaft
on which the knives or cutters are made fast stands with the lower end in
a step on a bridge tree — That by keys the same may be raised or lowered
according to the thickness of the boards, which the knives or cutters are to
plane, — The upper end of said shaft is made fast by box and bin-
der on an ellipticc arch made of cast iron extending across over the
frame each end made fast on each edge of the frame by screw bolts
— Two boards pass on the top of the frame under the knives or
cutters one on each side of the vertical shaft, The knives or cutters
marked No 16 plane the boards to a thickness as they pass — The
cutters on the shaft on which the band wheel No. 7 and No 4 are
made fast they make the tongue and groove as they pass — The
boards are put into motion by rollers made of wood and iron shaft expending through them on which shafts are made fast 3 bands wheels No. 13 No. 14 and No. 15 — Pulley or band wheel No. 9, being 28 inches in diameter and is made fast on an iron shaft 4 feet 6 inches long and lays horrizontal across the frame and gives motion to No. 10 on same shaft being 8 inches in diameter and by band gives motion to No. 11

Pulley on band wheel No. 11 being 10 inches in diameter and is made fast on an iron shaft 4 feet long 1½ inches square and lays horrizontal across the frame and gives motion to 2 wheels No. 12 being 4 inches in diameter and by bands gives motion to 2 wheels No. 13. being 20 inches in diameter and gives motion to No. 14 being 20 inches in diameter and by band gives motion to No. 15 being 20 inches in diameter and made fast on the iron shafts expending through the rollers made wood 4 inches in diameter iron points put therein and gives motion to 2 boards that the machine is then opperating — The two boards enter at the one end of the machine on the top of the frame and pass to the other end where they will be discharged and the opperation of the machine had upon them, they are both made smooth, made to a widelth and to a thickness and are in full readyness to be laid down into a floor.

The boards are kept to their place by slides and rollers there in [illegible] — N. B. Band wheels marked No. 3½ and 16 see on the longitudinall section of the machine.

August 19th A. D. 1836

P. M. Martz.

Witnesses
Geo. L. Kinnard
S. H. Crawford

Exd Ch[illegible]

1305 [illegible]

Drawing